(12) United States Patent  (10) Patent No.: US 8,594,721 B2
Roberts  (45) Date of Patent: *Nov. 26, 2013

(54) PROXIMITY PURCHASE RINGTONES

(75) Inventor: John R. Roberts, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,772

(22) Filed: Jun. 19, 2012

(65) Prior Publication Data

US 2012/0258770 A1 Oct. 11, 2012

Related U.S. Application Data

(63) Continuation of application No. 12/434,463, filed on May 1, 2009, now Pat. No. 8,224,375.

(51) Int. Cl.
*H04M 1/00* (2006.01)

(52) U.S. Cl.
USPC .............................. 455/550.1; 705/20; 705/26

(58) Field of Classification Search
USPC .................... 455/550.1; 705/20, 39, 17, 26
See application file for complete search history.

(56) References Cited

U.S. PATENT DOCUMENTS

| 5,208,446 | A | 5/1993 | Martinez |
| 5,221,838 | A | 6/1993 | Gutman et al. |
| 5,387,784 | A | 2/1995 | Sarradin |
| 5,490,251 | A | 2/1996 | Clark et al. |
| 6,612,488 | B2 | 9/2003 | Suzuki |
| 6,934,689 | B1 | 8/2005 | Ritter et al. |
| 7,128,274 | B2 | 10/2006 | Kelley et al. |
| 7,273,168 | B2 | 9/2007 | Linlor |
| 7,360,697 | B1 * | 4/2008 | Sarkar et al. ................. 235/383 |
| 7,447,494 | B2 | 11/2008 | Law et al. |
| 7,512,567 | B2 | 3/2009 | Bemmel et al. |
| 7,881,658 | B2 | 2/2011 | Weisman et al. |
| 7,930,249 | B2 | 4/2011 | Roberts |
| 8,085,913 | B2 | 12/2011 | Wilkes |
| 8,224,375 | B2 | 7/2012 | Roberts |
| 2003/0220835 | A1 | 11/2003 | Barnes, Jr. |
| 2004/0044627 | A1 | 3/2004 | Russell et al. |
| 2005/0154796 | A1 | 7/2005 | Forsyth |

(Continued)

FOREIGN PATENT DOCUMENTS

| CN | 1835007 A | 9/2006 |
| CN | 101098361 A | 1/2008 |

(Continued)

OTHER PUBLICATIONS

International Search Report and Written Opinion—PCT/US2010/032953, International Search Authority—European Patent Office—Jan. 18, 2011.

(Continued)

*Primary Examiner* — David Q Nguyen
(74) *Attorney, Agent, or Firm* — Nicholas A. Cole

(57) ABSTRACT

A method and wireless device for conduction transactions at a point-of-sale terminal using the wireless device is disclosed and may include initiating a transaction with the point-of-sale terminal via a wireless link, receiving at least one price from the point-of-sale terminal, determining whether the at least one price satisfies a price warning condition, and transmitting a signal if the at least one price satisfies the price warning condition.

69 Claims, 8 Drawing Sheets

(56) References Cited

U.S. PATENT DOCUMENTS

| | | |
|---|---|---|
| 2005/0160014 A1 | 7/2005 | Moss et al. |
| 2005/0187873 A1 | 8/2005 | Labrou et al. |
| 2006/0004641 A1 | 1/2006 | Moore et al. |
| 2006/0079282 A1 | 4/2006 | Niimi |
| 2006/0095357 A1 | 5/2006 | Tanumihardja et al. |
| 2006/0165060 A1 | 7/2006 | Dua |
| 2007/0057038 A1 | 3/2007 | Gannon |
| 2007/0084913 A1 | 4/2007 | Weston |
| 2007/0228144 A1 | 10/2007 | Knackstedt et al. |
| 2007/0262134 A1 | 11/2007 | Humphrey et al. |
| 2007/0265006 A1 | 11/2007 | Washok et al. |
| 2007/0278290 A1 | 12/2007 | Messerges et al. |
| 2008/0011825 A1 | 1/2008 | Giordano et al. |
| 2008/0040284 A1 | 2/2008 | Hazel et al. |
| 2008/0052189 A1* | 2/2008 | Walker et al. .......... 705/26 |
| 2008/0082421 A1 | 4/2008 | Onyon et al. |
| 2009/0018954 A1 | 1/2009 | Roberts |
| 2009/0076966 A1 | 3/2009 | Bishop et al. |
| 2011/0161188 A1 | 6/2011 | Roberts |

FOREIGN PATENT DOCUMENTS

| | | |
|---|---|---|
| EP | 1087314 A2 | 3/2001 |
| EP | 1540625 A2 | 6/2005 |
| JP | 2002269485 A | 9/2002 |
| JP | 2002279320 A | 9/2002 |
| JP | 2003076958 A | 3/2003 |
| JP | 2003272047 A | 9/2003 |
| JP | 2004145877 A | 5/2004 |
| JP | 2005148924 A | 6/2005 |
| JP | 2006093912 A | 4/2006 |
| JP | 2007102319 A | 4/2007 |
| JP | 2007141055 A | 6/2007 |
| KR | 20020076750 A | 10/2002 |
| KR | 20040016770 A | 2/2004 |
| KR | 20050023102 A | 3/2005 |
| KR | 20060114032 A | 11/2006 |
| KR | 20070053680 A | 5/2007 |
| WO | WO9705731 A1 | 2/1997 |
| WO | WO0075885 A1 | 12/2000 |
| WO | WO0213444 A2 | 2/2002 |
| WO | WO02080122 A1 | 10/2002 |
| WO | WO2005079254 | 9/2005 |
| WO | 2005098769 A1 | 10/2005 |
| WO | WO2007081519 A2 | 7/2007 |
| WO | 2007116521 A1 | 10/2007 |
| WO | WO2008086428 A1 | 7/2008 |

OTHER PUBLICATIONS

Khachtchanski et al. "Universal SIM toolkit-based client for mobile authorization system," IIWAS 2001, International Conference of Information Integration and Web-based Applications and Services, pp. 337-344.

Knospe et al., "Secure mobile commerce1," Security for Mobility, Chapter 14, IEE Telecommunications Series 15, 2004, pp. 325-345.

Mallalieu et al., "Pro Poor Mobile Capabilities: Service Offering in Latin America and the Caribbean," DIRSI Regional Dialogue on the Information Society, Mobile Opportunities: Background Paper, 2007, 55 pages.

Munro, "Mobile Phone Primed for Contactless Payment," Telecommunication Americas, Horizon House, 2006, pp. 12-13.

Ng-Krulle et al., "The Price of Convenience: Implications of Socially Pervasive Computing for Personal Privacy," School of Computer and Information Science, University of South Australia, 2006, 300 pages.

Rouibah, "Does Mobile Payment Technology Mnet Attract Potential Consumers" The Case of Kuwait, ACIS 2007 Proceedings, Paper 24, 14 pages.

Sanders, "From EMV to NFC: the contactless trail", Card Technology Today, Elsevier, Mar. 2008, pp. 12-13.

Schwiderski-Grosche et al., "Secure M-Commerce," Electron. Commun. Eng. J., 2002, 16 pages.

Stanley, "Banking Technology," IBC Business Publishing, Apr. 2004, pp. 24-26.

Witteman et al., "Efficient proximity detection among mobile clients using the GSM network," EEMCS: Electrical Engineering, Mathematics and Computer Science, 2007, 83 pages.

* cited by examiner

PROXIMITY PURCHASE RINGTONES

RELATED APPLICATIONS

This application is a Continuation of and claims priority to U.S. patent application Ser. No. 12/434,463 filed on May 1, 2009 entitled "PROXIMITY PURCHASE RINGTONES," which is assigned to the assignee hereof and hereby incorporated by reference in its entirety.

DESCRIPTION OF THE RELATED ART

As wireless devices evolve, they are being used more increasingly to conduct transactions with point-of-sale (POS) terminals. Near field communication (NFC) may allow a wireless device, e.g., a cellular telephone, to be used to make a close proximity purchase using the same frequency as contactless credit cards or contactless debit cards. The wireless device may automatically decide which payment instrument, i.e., which user account, to present to a point-of-sale terminal at the time of purchase. Since this process may be automated, a user may not easily know which payment instrument is selected for the transaction.

Accordingly, what is needed is an improved system and method of conducting transactions using a wireless device.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, the terms "communication device," "wireless device," "wireless telephone," "wireless communications device," and "wireless handset" are used interchangeably. With the advent of third generation (3G) wireless technology, more bandwidth availability has enabled more electronic devices with wireless capabilities. Therefore, a wireless device could be a cellular telephone, a pager, a PDA, a smartphone, a navigation device, or a computer with a wireless connection.

Figure 1:
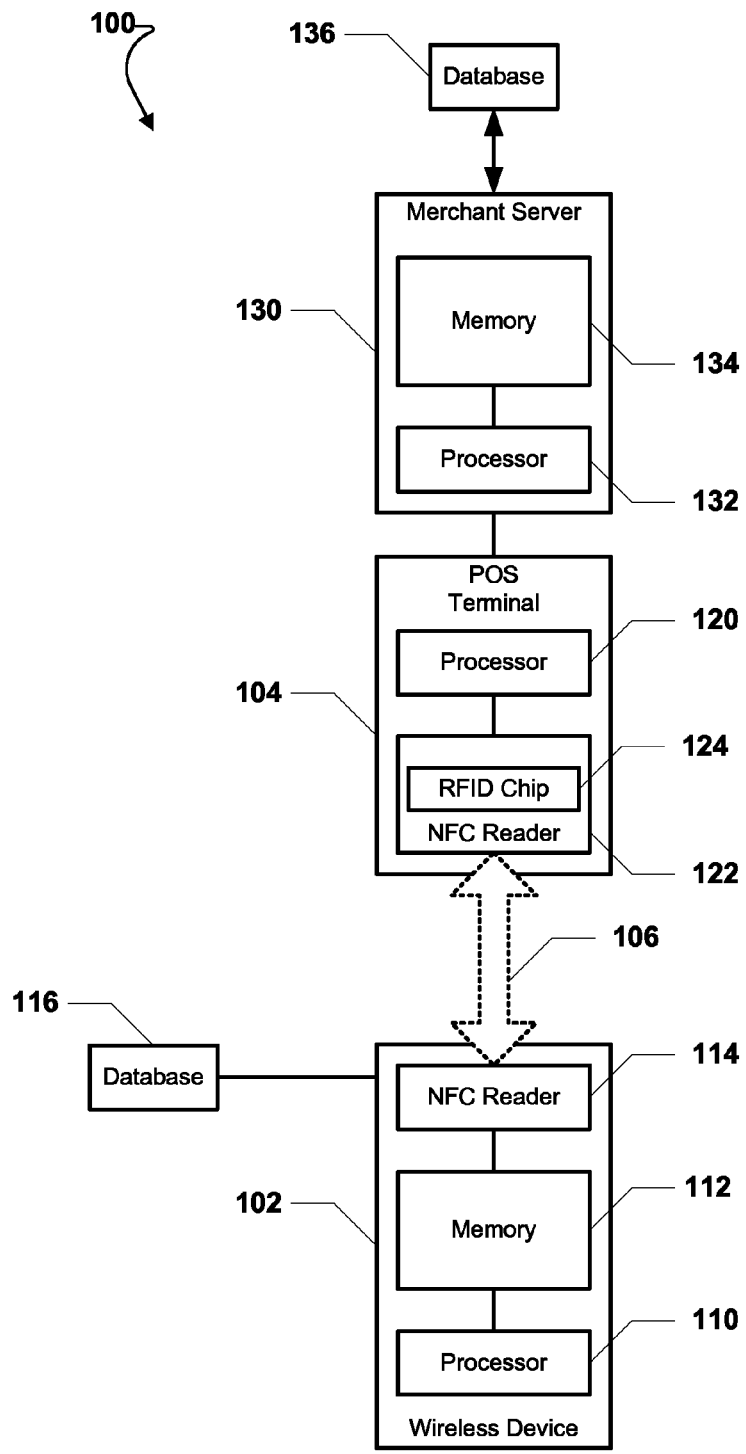
FIG. 1 is a diagram of a transaction system.

Referring to FIG. 1, a transaction system is shown and is designated 100. As shown, the transaction system 100 may include a wireless device 102 and a point-of-sale (POS) terminal 104. When the wireless device 102 is close to the POS terminal 104, the wireless device 102 may be connected to the POS terminal via a wireless connection 106. In a particular aspect, the wireless connection 106 may be provided by near field communication (NFC).

As shown in FIG. 1, the wireless device 102 may include a processor 110. A memory 112 may be connected to the processor 110. Further, an NFC reader 114 may be connected to the processor 110. In a particular aspect, the processor 110, the memory 112, the NFC reader 114, or a combination thereof may serve as a means for executing one or more of the method steps described herein. As shown, the wireless device 102 may be connected to, communicate with, or include, a database 116. The database 116 may include information about various items for sale. For example, the database 116 may include price information about various goods based on location, sale, etc. The database 116 may be queried using an item name, an item stock keeping unit (SKU) number, an item universal product code (UPC), an item location, some other identifier, or a combination thereof.

The POS terminal 104 may also include a processor 120. An NFC reader 122 may be coupled to the processor 120. Moreover, the NFC reader 122 within the POS terminal 104 may include an RFID chip 124. The RFID chip 124 may be a FeliCa card, a FeliCa tag, a Mifare card, a Mifare tag, or a combination thereof. Alternatively, the RFID chip 124 may be an ISO 14443-compliant contactless card. In another aspect, the RFID chip 124 may be an ISO 18092-compliant contactless card. Otherwise, the RFID chip 124 may be another contactless card well known in the art.

In a particular aspect, the RFID chip 124 may include information related to a merchant, e.g., a merchant identification. The merchant identification may include a merchant identification number, a merchant name, a merchant store number, or a combination thereof. In a particular aspect, the processor 120, the NFC reader 122, the RFID chip 124 or a combination thereof may serve as a means for executing one or more of the method steps described herein.

As illustrated, the POS terminal 104 may be connected to a merchant server 130. The merchant server 130 may include a processor 132 and a memory 134 that may be connected to the processor 132. In a particular aspect, the processor 132, the memory 134, or a combination thereof may serve as a means for executing one or more of the method steps described herein. The merchant server 130 may also be connected to a database 136. The database 136 may include customer information, e.g., loyalty card information. Further, the database 136 may include coupon information.

The various aspects described herein make use of wireless proximity-limited communication technologies to exchange files, e.g., loyalty card information, coupon information, merchant information, other information, or a combination thereof, between devices. A variety of wireless proximity-limited communication technologies may be used for this purpose. Examples of proximity-limited communication technologies include: near-field communications (NFC) protocol technologies; Bluetooth® protocol technologies; wireless personal area networks (WPAN) technologies based upon IEEE 802.14.4, including ZigBee®, WirelessHART and MiWi specifications; and infrared communication technologies, such as the IrDA (Infrared Data Association) protocol.

NFC technology devices operate in the unregulated RF band of 13.56 MHz and fully comply with existing contactless smart-card technologies, standards, and protocols such as FeliCa and Mifare. NFC-enabled devices are interoperable with contactless smart-cards and smart-card readers conforming to these protocols. The effective range of NFC protocol communications is approximately 0-20 cm (up to 8 in.), and data communications terminate either by a command from an application using the link or when the communicating devices move out of range.

However, the aspects and the claims are not necessarily limited to any one or all of the NFC protocols, and instead may encompass any close range (i.e., proximity-limited) wireless communication link. The Bluetooth® communication protocol is another suitable close range communication link that may be used. Bluetooth® transceivers may be configured to establish communication links automatically or in response to user commands as part of the various aspects as are provided for in the Bluetooth® protocol. The IrDA (Infrared Data Association) protocol may be used since the infrared transceivers must be within visual range of each other in order to establish a communication link, thereby restricting communications to situations where two mobile device users are cooperating to establishing the communication link. Short range wireless communication technologies, such as WPAN technologies based upon the IEEE 802.15.4 protocol may also be used, perhaps with range limiting features such as reduced transmission power level. In addition, other close range communication protocols and standards may be developed which may be used in the various aspects in the same manner as NFC, Bluetooth®, IrDA, and WPAN protocol devices.

Further, longer range wireless technologies and protocols may be used with modifications or additions that limit their effective range for purposes of identifying electronic devices one to another. For example, IEEE 802.11 (WiFi) (which communicates using the 2.4 GHz frequency band) and UWB (Ultra Wideband) wireless communication protocols and standards may also be used in combination with range-limiting features. For example, the power of transmitters may be limited for authentication communications, such that two devices must be relatively close together (e.g., within a few feet of each other) in order to send and receive the communications contemplated in the various aspects. As another example, round-trip communication delay limits may be imposed such that authentication communications may only occur if the round trip of such signals is less than a threshold set to reject signals sent from more than a dozen feet or so, and maybe as short as two to three feet separation.

For simplicity of reference, the various aspects and the claims refer to "close range communications" and "near field communications" in order to encompass any and all wireless proximity-limited communication technologies. References herein to "close range communication links" and "near field communications" are not intended to limit the scope of the description or the claims in any way other than the communications technology will not exchange credential information beyond the immediate vicinity of a user, which may be about three meters (about twelve feet). In a preferred aspect, the close communication range is limited to less than about one meter (about three feet), in a further preferred aspect, the communication range is limited to less than about one foot, and in some aspects the communication range is limited to approximately 0-20 cm (up to 8 in.). In order to reflect this distinction, descriptions of aspects using links with communication ranges of approximately 0-20 cm (up to 8 in.) refer to "NFC protocol" links. Therefore, references to "NFC protocol" communications are intended to be limited to communications transceivers and technologies with ranges provided by the various NFC protocols and standards listed above, but may also include technologies with a similar limited communication range.

With close range communications like NFC protocol devices it is easy to connect any two devices to each other with a secure wireless data link to exchange information or access content and services. Solution vendors argue that the intuitive operation of NFC protocol systems makes the technology particularly easy for consumers to use ("just touch and go"), while the inherent security resulting from its very short communication range makes such systems ideal for mobile payment and financial transaction applications. Familiar applications of NFC protocol technology are electronic pass keys used in building security systems, mass transit fare card systems, and smart credit cards which need only to be brought close to a point of sale reader to complete a transaction.

Figure 2:
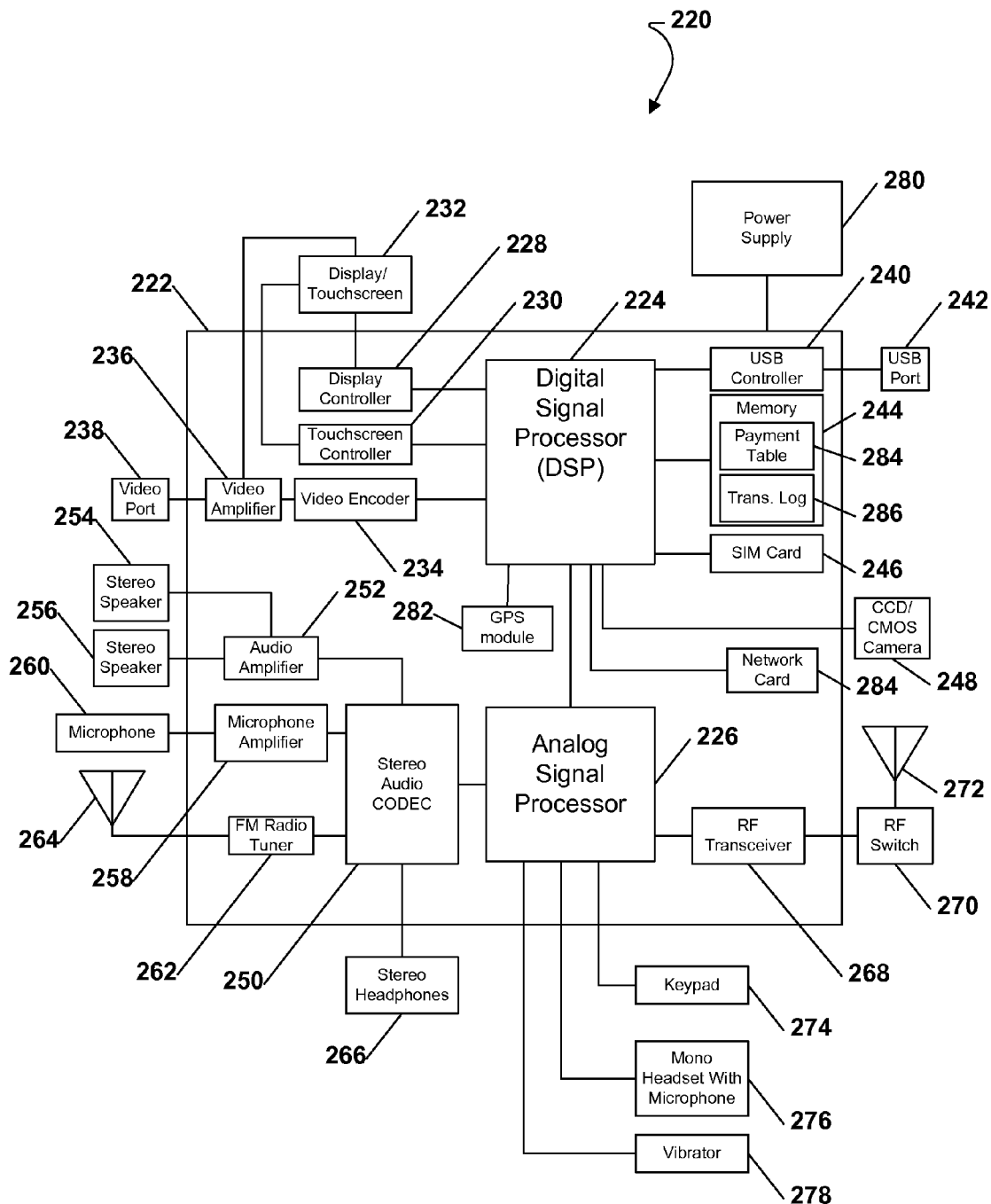
FIG. 2 is a diagram of a telephone.

Referring to FIG. 2, an exemplary, non-limiting aspect of a wireless device is shown and is generally designated 220. As shown, the wireless device 220 includes an on-chip system 222 that includes a digital signal processor 224 and an analog signal processor 226 that are coupled together. As illustrated in FIG. 2, a display controller 228 and a touchscreen controller 230 are coupled to the digital signal processor 224. In turn, a touchscreen display 232 external to the on-chip system 222 is coupled to the display controller 228 and the touchscreen controller 230.

FIG. 2 further indicates that a video encoder 234, e.g., a phase alternating line (PAL) encoder, a sequential couleur a memoire (SECAM) encoder, or a national television system(s) committee (NTSC) encoder, is coupled to the digital signal processor 224. Further, a video amplifier 236 is coupled to the video encoder 234 and the touchscreen display 232. Also, a video port 238 is coupled to the video amplifier 236. As depicted in FIG. 2, a universal serial bus (USB) controller 240 is coupled to the digital signal processor 224. Also, a USB port 242 is coupled to the USB controller 240. A memory 244 and a subscriber identity module (SIM) card 246 may also be coupled to the digital signal processor 224. Further, as shown in FIG. 2, a digital camera 248 may be coupled to the digital signal processor 224. In an exemplary aspect, the digital camera 248 is a charge-coupled device (CCD) camera or a complementary metal-oxide semiconductor (CMOS) camera.

As further illustrated in FIG. 2, a stereo audio CODEC 250 may be coupled to the analog signal processor 226. Moreover, an audio amplifier 252 may coupled to the stereo audio CODEC 250. In an exemplary aspect, a first stereo speaker 254 and a second stereo speaker 256 are coupled to the audio amplifier 252. FIG. 2 shows that a microphone amplifier 258 may be also coupled to the stereo audio CODEC 250. Additionally, a microphone 260 may be coupled to the microphone amplifier 258. In a particular aspect, a frequency modulation (FM) radio tuner 262 may be coupled to the stereo audio CODEC 250. Also, an FM antenna 264 is coupled to the FM radio tuner 262. Further, stereo headphones 266 may be coupled to the stereo audio CODEC 250.

FIG. 2 further indicates that a radio frequency (RF) transceiver 268 may be coupled to the analog signal processor 226. An RF switch 270 may be coupled to the RF transceiver 268 and an RF antenna 272. As shown in FIG. 2, a keypad 274 may be coupled to the analog signal processor 226. Also, a mono headset with a microphone 276 may be coupled to the analog signal processor 226. Further, a vibrator device 278 may be coupled to the analog signal processor 226. FIG. 2 also shows that a power supply 280 may be coupled to the on-chip system 222. In a particular aspect, the power supply 280 is a direct current (DC) power supply that provides power to the various components of the wireless device 220 that require power. Further, in a particular aspect, the power supply is a rechargeable DC battery or a DC power supply that is derived from an alternating current (AC) to DC transformer that is connected to an AC power source.

In a particular aspect, the wireless device 220 may further include a global positioning system (GPS) module 282 that may be couple coupled to the DSP 224, the analog signal processor 226, or a combination thereof. The GPS module 282 and at least one of the processors 224, 226 may provide a means for locating the wireless device 220 either alone or in conjunction with network information available to the wireless device 220, e.g., using a table available to the GPS module 282 via a wireless network.

FIG. 2 further shows that the wireless device 220 may also include a network card 284 that may be used to access a data network, e.g., a local area network, a personal area network, or any other network. The network card 284 may be a Bluetooth network card, a WiFi network card, a personal area network (PAN) card, a personal area network ultra-low-power technology (PeANUT) network card, or any other network card well known in the art. Further, the network card 284 may be incorporated into a chip, i.e., the network card 284 may be a full solution in a chip, and may not be a separate network card 284. The wireless device 220 may further include a payment module 286. The payment module 286 may execute one or more of the methods steps described herein.

As depicted in FIG. 2, the touchscreen display 232, the video port 238, the USB port 242, the camera 248, the first stereo speaker 254, the second stereo speaker 256, the microphone 260, the FM antenna 264, the stereo headphones 266, the RF switch 270, the RF antenna 272, the keypad 274, the mono headset 276, the vibrator 278, and the power supply 280 are external to the on-chip system 222.

In a particular aspect, one or more of the method steps described herein may be stored in the memory 244 as computer program instructions. These instructions may be executed by a processor 224, 226, the payment module 286, or a combination thereof in order to perform the methods described herein. Further, the processors, 224, 226, the payment module 286, the memory 244, the instructions stored therein, or a combination thereof may serve as a means for performing one or more of the method steps described herein.

Referring now to FIG. 3 through FIG. 8, a method of conducing transactions at a wireless device is shown and is generally designated 300. The method 300 commences at block 302 with a do loop in which when a wireless device placed near a point-of-sale (POS) terminal, the following steps are performed. At block 304, a payment module within the wireless device may initiate a transaction with the POS terminal via a wireless link, e.g., an NFC link or other link described herein. At block 306, the payment module may determine a payment selection, e.g., based on one or more user preferences, a hierarchy of payment methods determined by a user, or a combination thereof.

Moving to decision 308, the payment module may determine whether an audible signal is associated with the payment selection. If so, the method 300 may continue to block 310 and the payment module may transmit an audible signal to the user via the wireless device, e.g., one or more speakers therein.

The audible signal may be a song, a song clip, a ringtone, a voice tone, a spoken message, or a combination thereof. The audible signal may be user defined, preset on the device, or a combination thereof. Further, the audible signal may indicate type of payment, e.g., a debit account, a credit account, a gift account, a rewards account, etc. The audible signal may also indicate a name associated with a debit account, a credit account, a gift account, a rewards account, etc. Moreover, the audible signal may indicate a merchant to which payment is being made. The audible signal may also be used to indicate that a price satisfies a warning condition, e.g., that a price is too high when compared to similar items in a database.

The audible signal may be used to indicate that a coupon is valid or invalid. Also, the audible signal may be used to indicate that a coupon is accepted or not accepted. Further, the audible signal may be used to indicate that a total amount due satisfies a warning condition, e.g., that a total amount due is too high based on one or more user defined settings. The audible signal may indicate that a debit account does not contain sufficient funds to pay for an item or combination of items. The audible signal may indicate that a debit account balance satisfies a warning condition, e.g., that the debit account balance is below a predetermined, or user determined, amount.

The audible signal may indicate that a credit account does not include sufficient available credit to pay for an item or combination of items. Further, the audible signal may indicate that a credit account balance satisfies a warning condition, e.g., that a credit account balance is higher than a predetermined, or user determined, amount. The audible signal may indicate whether a payment is approved by a merchant point-of-sale terminal The audible signal may indicate whether a final total satisfies a final total warning condition, e.g., that a final total warning condition exceeds a predetermined, or user determined, amount.

The method 300 may then proceed to block 312 and continue as described herein. Returning to decision 308, if the payment selection does not include an audible signal associated therewith, the method 300 may move directly to block 312.

At block 312, the payment module may receive an item description. The item description may include a SKU number, a UPC code, an item size, some other item identifier, or a combination thereof. In the case of multiple items, the payment module may receive multiple item descriptions. At block 314, the payment module may receive an item price, or prices.

Moving to block 316, the payment module may determine the location of the wireless device, e.g., by accessing a GPS module within the wireless device. At block 318, the payment module may search a database using each item description, location, SKU number, a UPC code, an item size, or a combination thereof in order to determine one or more comparative prices of each item. Thereafter, at decision 320, the payment module may determine whether any price equals, or satisfies, a warning condition. The warning condition may be based on a comparison between the price received from the POS terminal and a price determined after a search of the database. The warning condition may occur if the price from the POS terminal is higher than the price within the database. Further, the warning condition may occur if the price from the POS terminal is a pre-defined percentage higher than the price within the database. For example, the percentage may be five percent (5%), ten percent (10%), fifteen percent (15%), etc.

If each price does not equal the warning condition, the method 300 may continue to block 322 and the payment module may transmit and acknowledgement to the POS terminal to continue the transaction. Thereafter, the method 300 may continue to decision 342 of FIG. 5. Returning to decision step 320, if any price equals, or satisfies, a warning condition, the method 300 may continue to block 324 of FIG. 4 and continue as described herein.

Figure 4:
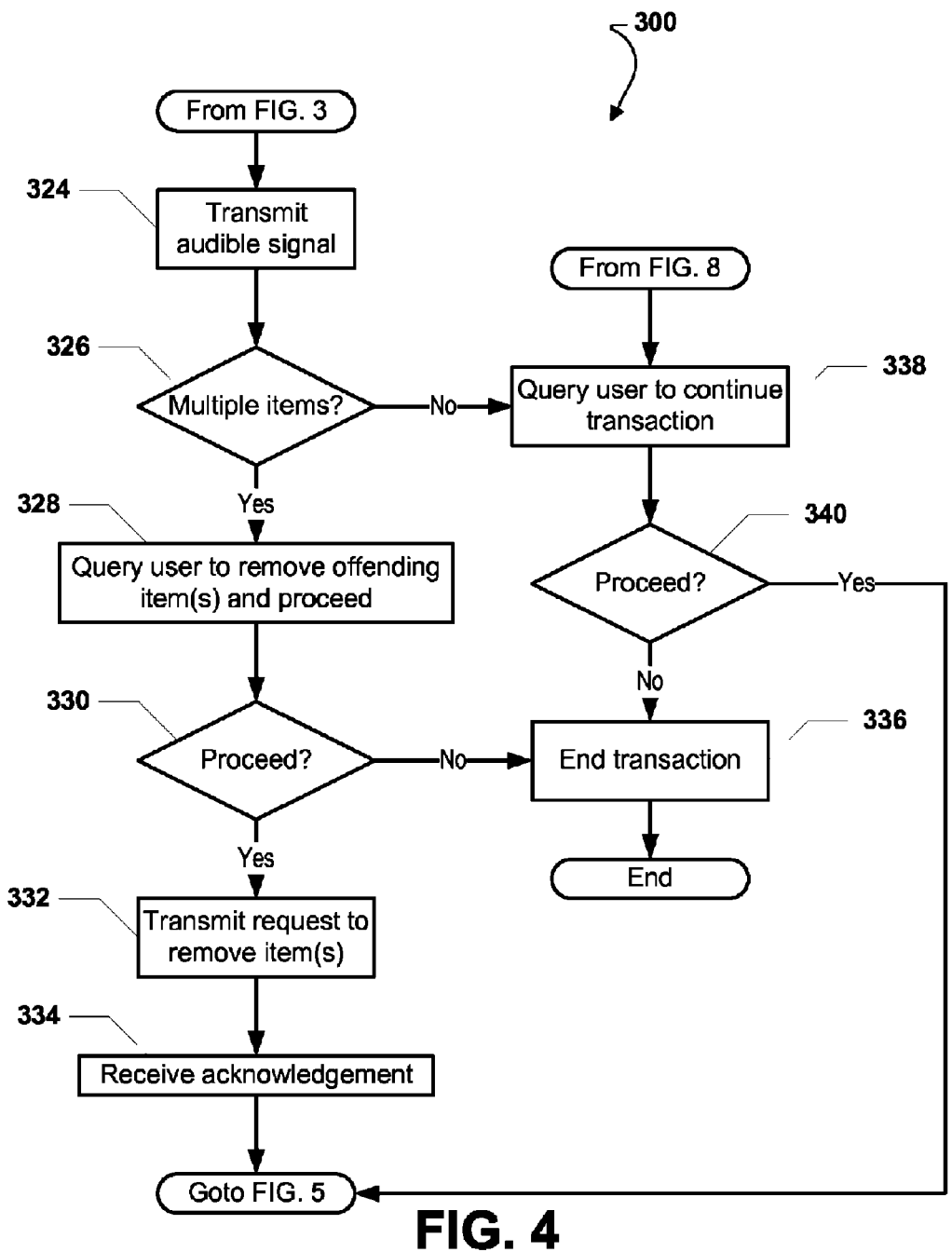
FIG. 4 is a flowchart illustrating a second portion of a method of conducting transactions at a point-of-sale terminal with a wireless device.

At block 324 of FIG. 4, the payment module may transmit an audible signal to a user via the wireless device, e.g., one or more speakers therein. The audible signal may be a user defined song clip, a user defined ringtone, a spoken message, i.e., a voice tone, that indicates a price of an item is too high, or a combination thereof.

Moving to decision 326, the payment module may determine whether the transaction involves multiple items. If so, the method 300 may continue to block 328 and the payment module may query the user to remove an offending, i.e., over-priced, items and proceed. At decision 330, the payment module may determine whether to proceed based on the query at block 328. If so, the method 300 may move to block 332 and the payment module may transmit a request to the POS terminal to remove the over-priced items. Thereafter, at block 334, the payment module may receive an acknowledgement from the POS terminal The method 300 may then proceed to decision 342 of FIG. 5 and continue as described herein.

Returning to decision 330, if the payment module determines to not proceed with the transaction, the method 300 may move to block 336 and the payment module may end the transaction. The method 300 may then end.

Returning to decision 326, if the transaction does not involve multiple items, the method 300 may move to block 338 and the payment module may query the user to determine whether the user wishes to continue with the transaction and purchase the over-priced item. At decision 340, based on the query in block 338, the payment module may determine whether to proceed with the transaction. If so, the method 300 may continue to decision 342 of FIG. 3 and continue as described herein. Conversely, if the payment module determines not to proceed with the transaction, the method 300 may move to block 336 wherein the transaction may be ended by the payment module. Thereafter, the method 300 may end.

Moving to decision 342, the payment module may determine whether a coupon is selected. If a coupon is selected, the method 300 may move to decision 344 and the payment module may determine whether the coupon is valid. If not, the method 300 may proceed to block 362 of FIG. 6 and continue as described herein. Otherwise, if the coupon is valid, the method 300 may move to block 346 and the payment module may transmit the coupon the POS terminal At block 348, the payment module may receive an acknowledgement from the POS terminal At decision 350, the payment module may determine whether the coupon is accepted, e.g., based on the acknowledgement from the POS terminal If the coupon is not accepted, the method 300 may move to block 352 and the payment module may transmit an audible signal to the user via the wireless device, e.g., one or more speakers therein. The audible signal may be a user defined song clip, a user defined ringtone, a spoken message that indicates the coupon is not accepted, or a combination thereof. Thereafter, the method 300 may continue to block 364 of FIG. 6 and proceed as described herein.

Returning to decision 350, if the coupon is accepted, the method 300 may proceed to block 354 and the payment module may transmit a request for a total amount due from the POS terminal Block 354 may also be reached from decision 342 if a coupon is not selected. Moving to decision 356, the payment module may determine whether the total amount due equals, or satisfies, a warning condition. The warning condition may be a threshold amount over which the user wants to be warned, e.g., fifty dollars ($50), one hundred dollars ($100), two hundred fifty dollars ($250), five hundred dollars ($500), etc.

If the total amount equals, or satisfies, the warning condition, the method 300 may continue to bock 358 and the payment module may transmit an audible signal via the wireless device, e.g., one or more speakers therein. The audible signal may be a user defined song clip, a user defined ringtone, a spoken message that indicates the total amount due exceeds a warning threshold, or a combination thereof. Thereafter, at decision 360, the payment module may determine whether the user would like to proceed with the transaction, e.g., by querying the user. If not, the method 300 may end. Otherwise, the method 300 may move to decision 370 of FIG. 7. The method 300 may also proceed to decision 370 of FIG. 7 when the total amount due does not equal the warning condition at decision 356.

Figure 6:
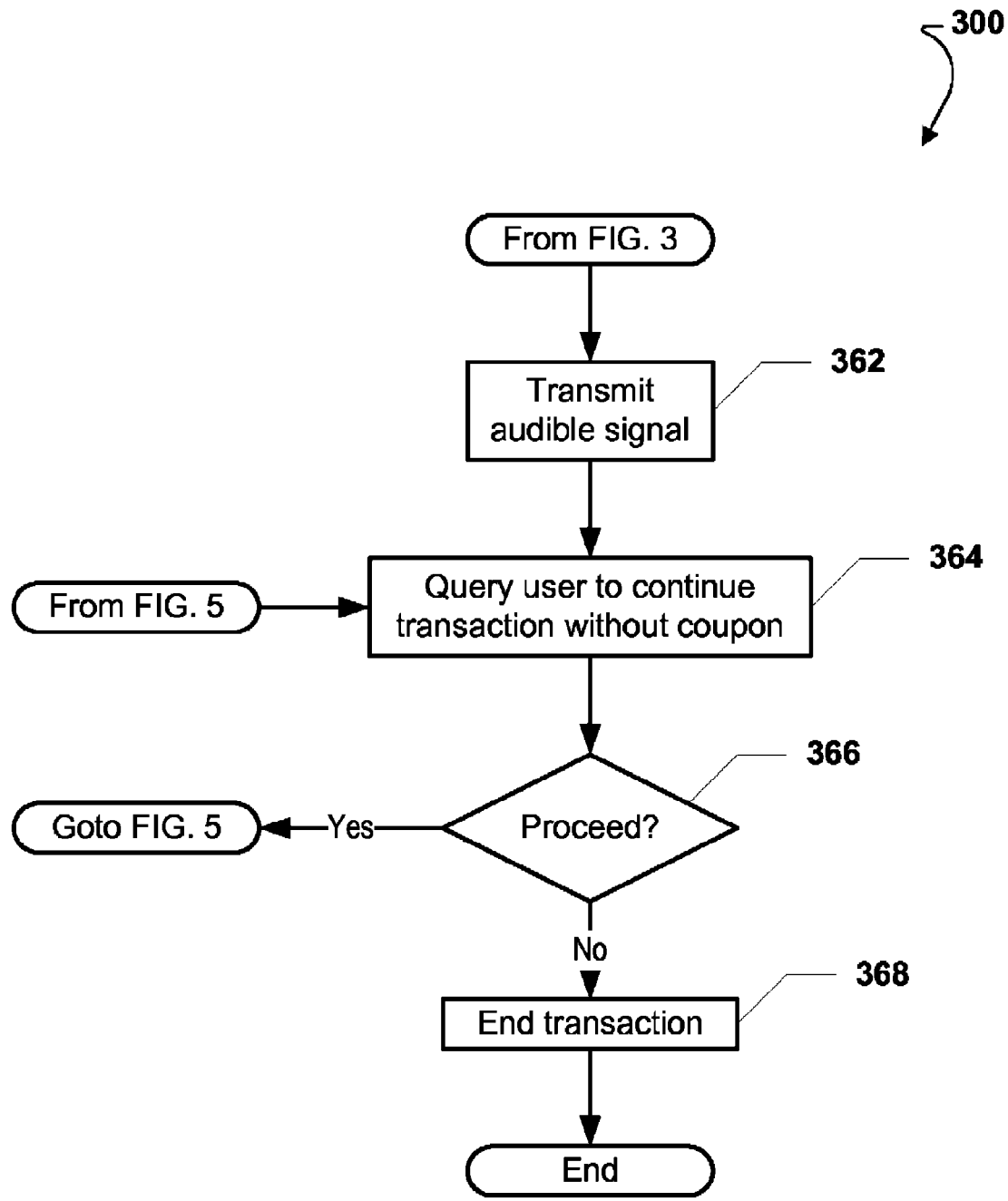
FIG. 6 is a flowchart illustrating a fourth portion of a method of conducting transactions at a point-of-sale terminal with a wireless device.

Returning to decision 344, if the coupon is not valid, the method 300 may move directly to block 362 of FIG. 6 and continue as described herein. At block 362 of FIG. 6, the payment module may transmit an audible signal via the wireless device, e.g., one or more speakers therein. The audible signal may be a user defined song clip, a user defined ringtone, a spoken message that indicates a coupon is invalid, a spoken message that indicates a coupon is expired, or a combination thereof. At block 364, the payment module may query the user to continue the transaction without the coupon. Next, at decision 366, the payment module may determine whether to proceed with the transaction based on the query above. If so, the method 300 may return to block 354 and continue as described herein. Otherwise, the method 300 may proceed to block 368 and the payment module may end the transaction. The method 300 may then end at.

Figure 5:
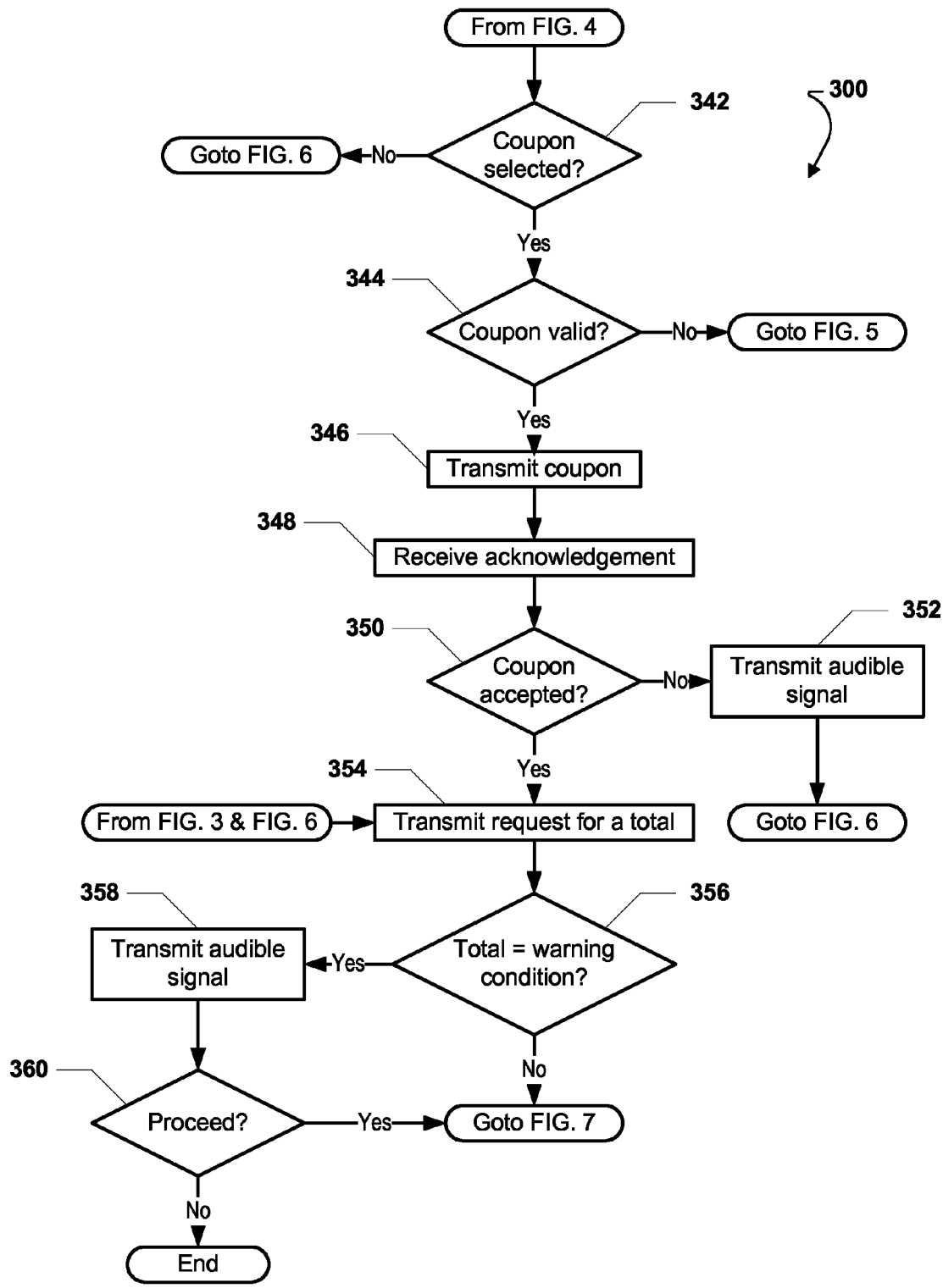
FIG. 5 is a flowchart illustrating a third portion of a method of conducting transactions at a point-of-sale terminal with a wireless device.
Figure 7:
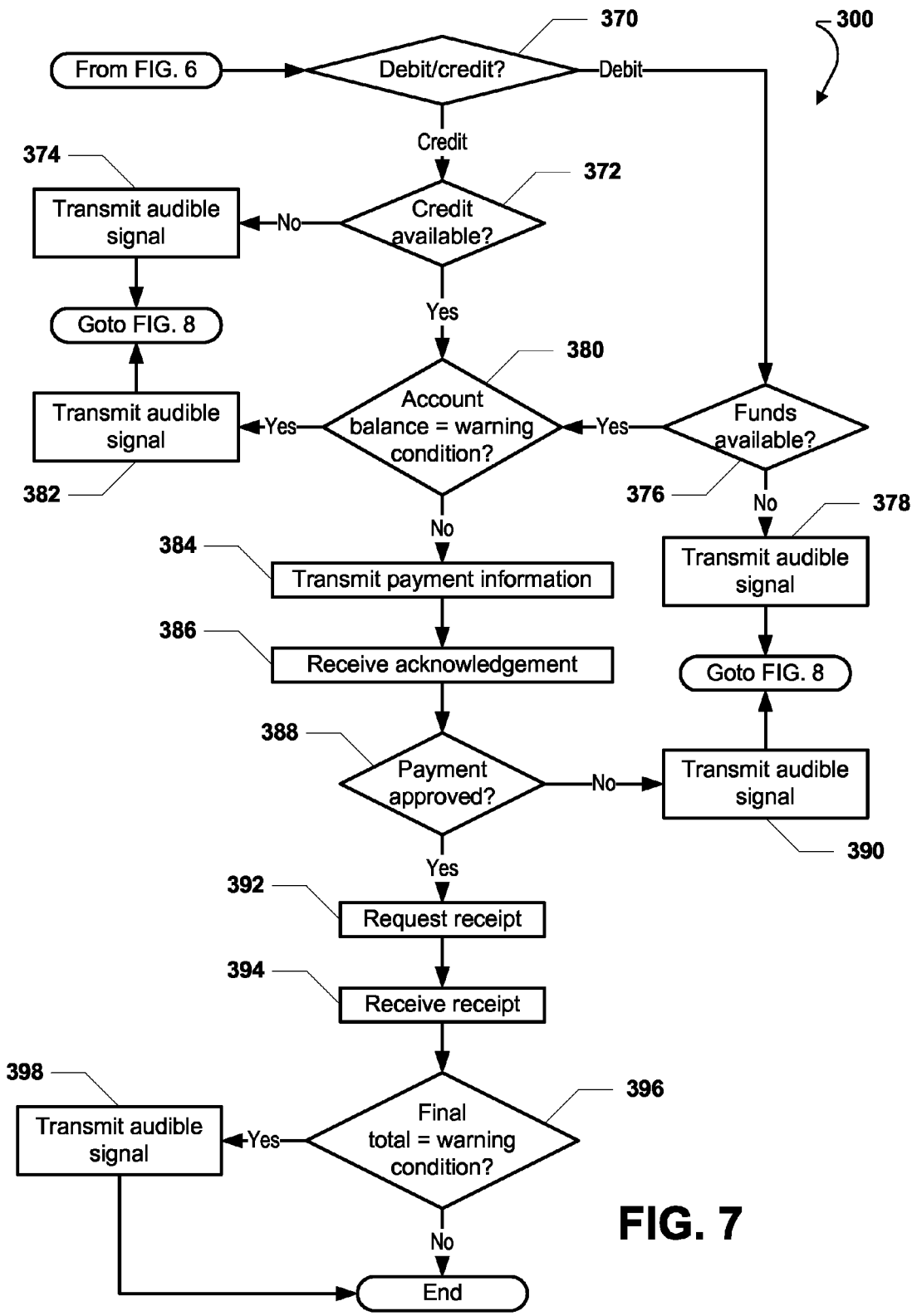
FIG. 7 is a flowchart illustrating a fifth portion of a method of conducting transactions at a point-of-sale terminal with a wireless device.

Returning to decision 356 of FIG. 5, if the total does not satisfy the warning condition, the method 300 may proceed to decision 370 of FIG. 7. Also, at decision 360 of FIG. 6, if the payment module determines to proceed with the transaction, the method 300 may also proceed to decision 370 of FIG. 7.

Figure 3:
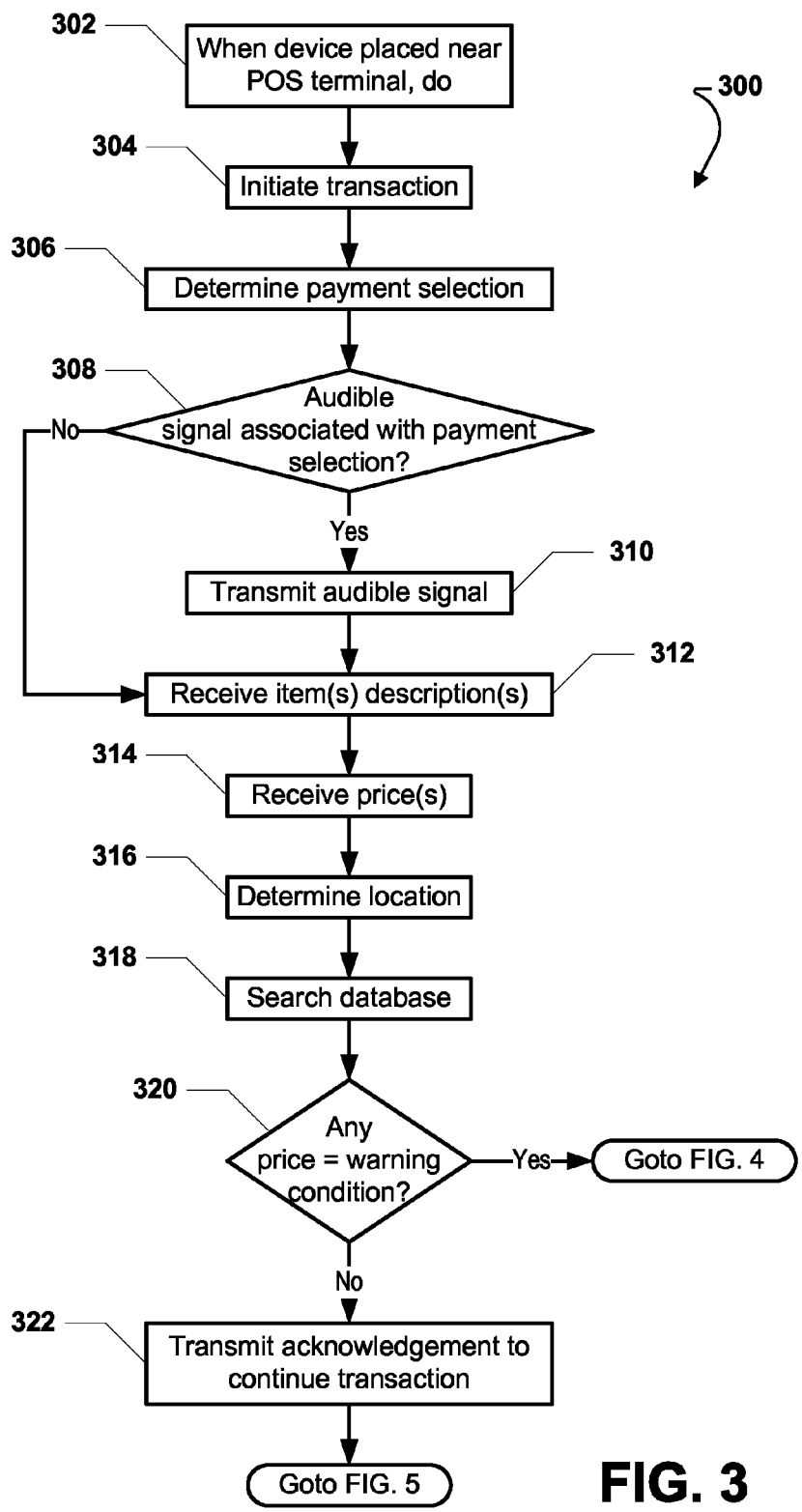
FIG. 3 is a flowchart illustrating a first portion of a method of conducting transactions at a point-of-sale terminal with a wireless device.

At decision 370, the payment module may determine whether the payment selection received at block 306 of FIG. 3 is a debit card or a credit card. If the payment selection is a credit card, the method 300 may proceed to decision 372 and the payment module may determine whether the proper amount of credit associated with the credit card, or credit account, is available. If not, the method 300 may proceed to block 374 and the payment module may transmit an audible signal to a user via the wireless device, e.g., one or more speakers therein. The audible signal may be a user defined song clip, a user defined ringtone, a spoken message that indicates the account associated with the selected credit card does not have enough available credit, or a combination thereof. Thereafter, the method 300 may proceed to decision 400 of FIG. 8 and continue as described herein. Returning to decision 372, if the account associated with the selected credit card has sufficient credit available, the method 300 may proceed to decision 376 and continue as described below.

Returning to decision 370, if the payment selection is a debit card, or debit account, the method 300 may proceed to decision 378 and the payment may determine whether the debit account has sufficient funds. If not, the method 300 may proceed to block 380 and the payment module may transmit an audible signal to a user via the wireless device, e.g., one or more speakers therein. The audible signal may be a user defined song clip, a user defined ringtone, a spoken message that indicates the debit account does not have sufficient funds for the transaction, or a combination thereof. Thereafter, the method 300 may proceed to decision 400 of FIG. 8 and continue as described.

Returning to decision 378, if the debit account contains sufficient funds, the method 300 may move to decision 376. The method 300 may also move to decision 376 from decision 372 when the credit account selected has sufficient credit available. At decision 376, the payment module may determine whether an account balance, e.g., credit account or debit account, equals, or satisfies, a warning condition. For example, if the account balance is above a threshold for a credit account or a below a threshold for a debit account, the account balance may equal the warning condition. If the account balance equals, or satisfies, the warning condition, the method 300 may proceed to block 382 and the payment module may transmit an audible signal to a user via the wireless device, e.g., one or more speakers therein. The audible signal may be a user defined song clip, a user defined ringtone, a spoken message that indicates a credit account balance is too high, a spoken message that indicates a debit account balance is too low, or a combination thereof. Then, the method 300 may proceed to decision 400 of FIG. 8 and continue as described.

Returning to decision 376, if the account balance does not equal the warning condition, the method 300 may proceed to block 384 and the payment module may transmit information to the POS terminal. At block 386, the payment module may receive an acknowledgement from the POS terminal At decision 388, the payment module may determine whether payment is approved. If payment is not approved, the method 300 may move to block 390 and the payment module may transmit an audible signal to a user via the wireless device, e.g., one or more speakers therein. The audible signal may be a user defined song clip, a user defined ringtone, a spoken message that indicates payment is not approved, or a combination thereof. The method 300 may then continue to decision 400 of FIG. 8 and continue as described.

At decision 388 if payment is approved, the method 300 may proceed to block 392 and the payment module may request a receipt, e.g., an electronic receipt ("e-receipt"), from the POS terminal. At block 394, the payment module may receive the receipt from the POS terminal Further, at decision 396, the payment module may determine whether the final total equals, or satisfies, a warning condition. The warning condition may be a threshold amount over which the user wants to be notified, e.g., fifty dollars ($50), one hundred dollars ($100), two hundred fifty dollars ($250), five hundred dollars ($500), etc.

If the final total equals, or satisfies, the warning condition, the method 300 may continue to bock 398 and the payment module may transmit an audible signal via the wireless device, e.g., one or more speakers therein. The audible signal may be a user defined song clip, a user defined ringtone, a spoken message that indicates the final total exceeds a warning threshold, or a combination thereof. At decision 396, if the final total does not equal the warning condition, the method 300 may end.

Figure 8:
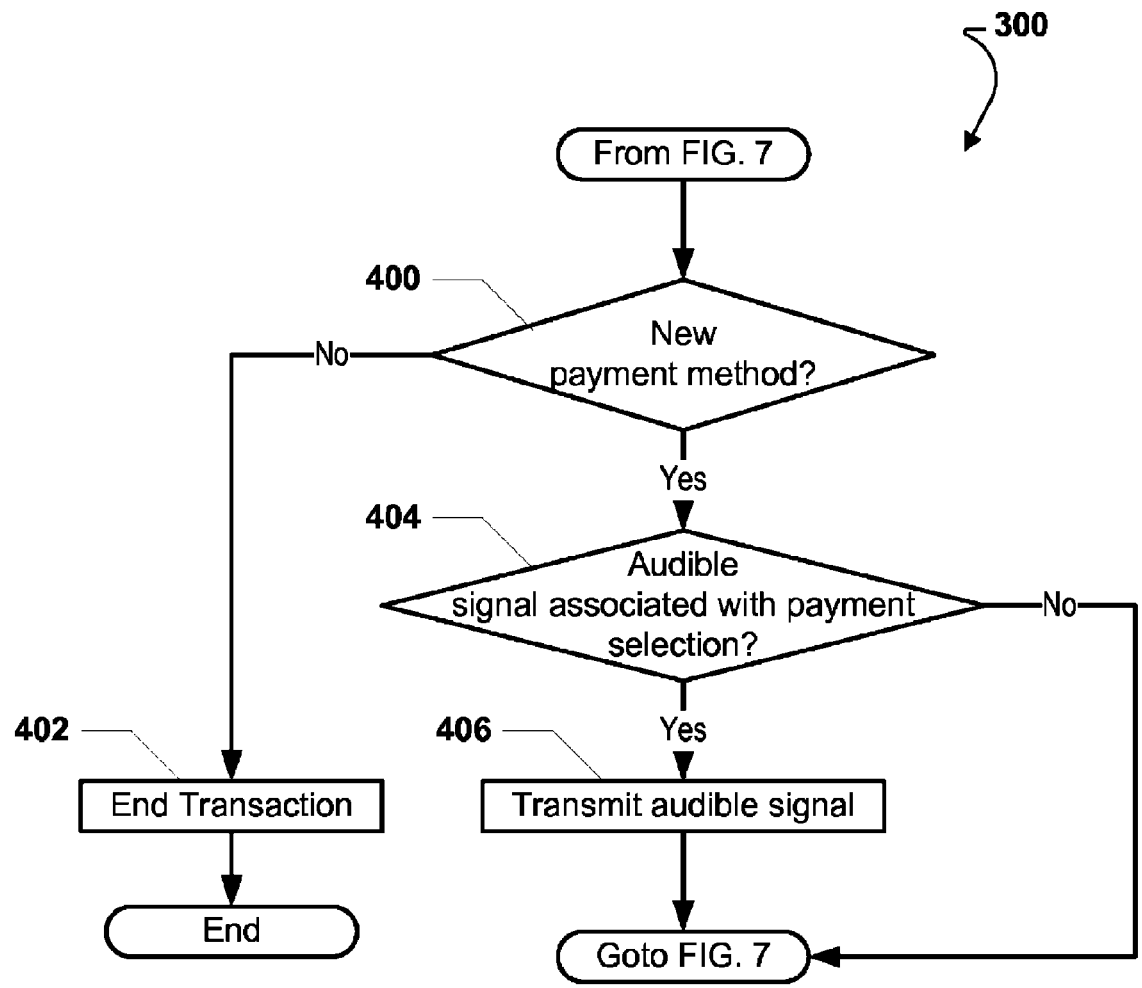
FIG. 8 is a flowchart illustrating a sixth portion of a method of conducting transactions at a point-of-sale terminal with a wireless device.

Proceeding to decision 400 of FIG. 8, the payment module may determine whether a new payment method is received from the user. If not, the method 300 may move to block 402 and the payment module may end the transaction. Thereafter, the method may end. If so, the method 300 may proceed to decision 404. At decision 404, the payment module may determine whether an audible signal is associated with the payment selection. If so, the method 300 may continue to block 406 and the payment module may transmit an audible signal to the user via the wireless device, e.g., one or more speakers therein. The audible signal may be a user defined song clip, a user defined ringtone, a spoken message that indicates the type of payment, a spoken message that indicates the source of the payment, or a combination thereof. The method 300 may then return to decision 370 of FIG. 7 and continue as described herein. Returning to decision 404, if the payment selection does not include an audible signal associated therewith, the method 300 may return to decision 370 of FIG. 7 and continue as described herein.

It is to be understood that the method steps described herein do not necessarily have to be performed in the order as described. Further, words such as "thereafter", "then", "next", etc. are not intended to limit the order of the steps. These words are simply used to guide the reader through the description of the method steps.

Further, it may be appreciated that many of the notifications or warnings described herein occur when a negative event occurs, e.g., when a price satisfies a warning condition, when a coupon is not valid, when a coupon is not accepted, when credit is not available, when funds are not available, when a payment is not approved, etc. However, the user may be also notified when a positive event occurs, e.g., when a price does not satisfy a warning condition, when a coupon is valid, when a coupon is accepted, when credit is available, when funds are available, when a payment is approved, etc. In such instances, these notifications may also be ringtones, voice tones, song clips, or combinations thereof.

With the configuration described herein, the system and method disclosed herein provides a way to automatically warn, or notify, a user of certain events while conducting transactions using a wireless device. For example, when a certain credit card is used, a first ringtone, voice tone, song clip, or combination thereof may be transmitted or emitted to the user. When a different credit card is used, a second ringtone, voice tone, song clip, or combination thereof may be transmitted or emitted to the user. As such, these ringtones, voice tones, etc. may be used to inform the user which payment instrument is used for a purchase. These ringtones, voice tones, etc. may be pre-loaded on a wireless device, loaded later by a user, customized by a user, or a combination thereof.

In a particular aspect, if there are multiple payment instruments used for a particular purchase, e.g., the combination of a coupon and a credit card, multiple ringtones may be played when the payment instruments are accepted by the point-of-sale terminal Also, the wireless device may emit a ringtone, voice tone, song clip, or a combination thereof, when a POS terminal reads a selected payment instrument.

In another aspect, different ringtones, voice tones, etc. may be transmitted to the user for different error conditions, e.g., when a credit card is declined authorization, when a credit account reaches a maximum credit limit, when a debit account reaches a minimum amount, when a coupon is invalid or expired, when a coupon is rejected, when a stored value loyalty card is decremented to a zero value, when a gift card is decremented to a zero value, when a store loyalty card is rejected, etc.

Additionally, if the amount of the purchase is available to the wireless device, another ringtone, voice tone, etc. may be transmitted to the user. For example, when a transaction is over a predetermined amount, e.g., one hundred dollars ($100), a particular ringtone, voice tone, etc., may be transmitted to the user. If the transaction is less than the predetermined amount, another ringtone, voice tone, etc., may be transmitted to the user. The audible feedback provided for herein may allow the user to more easily know the amount of a transaction, i.e., how much money is charged to a credit account or deducted from a debit account minus a coupon amount.

In another aspect, the pitch of the ringtone, voice tone, etc. may be increased when a transaction exceeds a particular threshold. When the transaction is below the threshold, a lower pitch ringtone, voice tone, etc. may be transmitted to the user. Conversely, when the transaction is above the threshold, a higher pitch ringtone may be transmitted to the user.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of conducting a transaction at a point-of-sale terminal using a wireless device, comprising:
   receiving at least one price from a point-of-sale terminal via a wireless link;
   determining whether the at least one received price satisfies a price warning condition;
   outputting a first signal at the wireless device in response to determining that the at least one received price satisfies the price warning condition;
   determining whether the transaction includes a plurality of items;
   in response to determining that the transaction includes a plurality of items:
     identifying one of the plurality of items associated with the at least one received price; and
     requesting user input to determine whether to remove the identified item from the transaction in response to determining that the at least one received price satisfies the price warning condition; and
   outputting a second signal at the wireless device in response to determining that the at least one received price does not satisfy the price warning condition.

2. The method of claim 1, wherein the first and second signals are audible signals, and the first signal has a pitch that is different than a pitch of the second signal.

3. The method of claim 1, wherein outputting the first signal at the wireless device comprises outputting the first signal immediately upon determining that the at least one received price satisfies the price warning condition.

4. The method of claim 1, wherein outputting the first signal at the wireless device comprises outputting the first signal at a time after determining that the at least one received price satisfies the price warning condition.

5. The method of claim 1, further comprising:
   receiving at least one item description from the point-of-sale terminal;
   determining a location of the wireless device; and
   searching a database with the at least one received price, the at least one item description, the determined location, or a combination thereof to determine at least one comparative price,
   wherein determining whether the at least one received price satisfies a price warning condition comprises comparing the at least one comparative price to the at least one received price to determine whether the at least one received price is greater than the at least one comparative price for the at least one item by a pre-defined threshold.

6. The method of claim 1, further comprising receiving a selection of a coupon in response to determining that the at least one received price satisfies the price warning condition.

7. The method of claim 6, further comprising:
   determining whether the coupon is valid; and
   outputting a third signal at the wireless device if the coupon is not valid.

8. The method of claim 7, further comprising:
   transmitting the coupon to the point-of-sale terminal if the coupon is valid;
   receiving a coupon acknowledgement from the point-of-sale terminal;
   determining whether the coupon is accepted based on the coupon acknowledgement from the point-of-sale terminal; and
   outputting a fourth signal at the wireless device in response to determining that the coupon is not accepted by the point-of-sale terminal.

9. The method of claim 8, further comprising:
   transmitting a request for a total amount due to the point-of-sale terminal;
   receiving a total amount due from the point-of-sale terminal;
   determining whether the total amount due satisfies a total amount due warning condition; and
   outputting a fifth signal at the wireless device in response to determining that the total amount due satisfies the total amount due warning condition.

10. The method of claim 9, further comprising:
    receiving a payment selection to complete a transaction for the total amount due;
    determining whether the payment selection includes a signal associated therewith; and
    outputting a sixth signal at the wireless device in response to determining that the payment selection includes a signal associated therewith.

11. The method of claim 10, further comprising determining whether the payment selection is a debit account or a credit account.

12. The method of claim 11, further comprising:
determining whether a debit account includes sufficient funds to pay for the transaction in response to determining that the payment selection is a debit account; and
outputting a seventh signal at the wireless device in response to determining that the debit account does not have sufficient funds to pay for the transaction.

13. The method of claim 11, further comprising:
determining whether a debit account balance satisfies a debit account warning condition in response to determining that the payment selection is a debit account; and
outputting an eighth signal at the wireless device in response to determining that the debit account balance satisfies the debit account warning condition.

14. The method of claim 11, further comprising:
determining whether a credit account includes sufficient credit to pay for the transaction in response to determining that the payment selection is a credit account; and
outputting a ninth signal at the wireless device in response to determining that the credit account does not have sufficient credit to pay for the transaction.

15. The method of claim 11, further comprising:
determining whether a credit account balance satisfies a credit account warning condition in response to determining that the payment selection is a credit account; and
outputting a tenth signal at the wireless device in response to determining that the credit account balance satisfies the credit account warning condition.

16. The method of claim 10, further comprising:
transmitting payment information to the point-of-sale terminal;
receiving a payment acknowledgement from the point-of-sale terminal;
determining whether payment is approved based on the payment acknowledgement from the point-of-sale terminal; and
outputting an eleventh signal at the wireless device in response to determining that the payment is not approved.

17. The method of claim 16, further comprising:
requesting a receipt from the point-of-sale terminal, if payment is approved;
receiving the receipt from the point-of-sale terminal;
determining whether a final total satisfies a final total warning condition; and
outputting a twelfth signal at the wireless device in response to determining that the final total satisfies the final total warning condition.

18. A wireless device, comprising:
a memory;
a wireless network card;
a speaker; and
a processor coupled to the memory, wireless network card, and speaker, wherein the processor is configured with processor-executable instructions to perform operations comprising:
receiving in a transaction at least one price from a point-of-sale terminal via a wireless link;
determining whether the at least one received price satisfies a price warning condition;
outputting a first signal in response to determining that the at least one received price satisfies the price warning condition;
determining whether the transaction includes a plurality of items;
in response to determining that the transaction includes a plurality of items:
identifying one of the plurality of items associated with the at least one received price; and
requesting user input to determine whether to remove the identified item from the transaction in response to determining that the at least one received price satisfies the price warning condition; and
outputting a second signal in response to determining that the at least one received price does not satisfy the price warning condition.

19. The wireless device of claim 18, wherein the processor is configured with processor-executable instructions to perform operations such that the first and second signals are audible signals, and the first signal has a pitch that is different than a pitch of the second signal.

20. The wireless device of claim 18, wherein the processor is configured with processor-executable instructions to perform operations such that outputting the first signal comprises outputting the first signal immediately upon determining that the at least one received price satisfies the price warning condition.

21. The wireless device of claim 18, wherein the processor is configured with processor-executable instructions to perform operations such that outputting the first signal comprises outputting the first signal at a time after determining that the at least one received price satisfies the price warning condition.

22. The wireless device of claim 18, wherein the processor is configured with processor-executable instructions to perform operations further comprising:
receiving at least one item description from the point-of-sale terminal;
determining a location of a transaction; and
searching a database with the at least one received price, the at least one item description, the location, or a combination thereof to determine at least one comparative price,
wherein determining whether the at least one received price satisfies a price warning condition comprises comparing the at least one comparative price to the at least one received price to determine whether the at least one received price is greater than at least one comparative price for the at least one item by a pre-defined threshold.

23. The wireless device of claim 18, wherein the processor is configured with processor-executable instructions to perform operations further comprising receiving a selection of a coupon in response to determining that the at least one received price satisfies the price warning condition.

24. The wireless device of claim 23, wherein the processor is configured with processor-executable instructions to perform operations further comprising:
determining whether the coupon is valid; and
outputting a third signal if the coupon is not valid.

25. The wireless device of claim 24, wherein the processor is configured with processor-executable instructions to perform operations further comprising:
transmitting the coupon to the point-of-sale terminal if the coupon is valid;
receiving a coupon acknowledgement from the point-of-sale terminal;
determining whether the coupon is accepted based on the coupon acknowledgement from the point-of-sale terminal; and
outputting a fourth signal in response to determining that the coupon is not accepted by the point-of-sale terminal.

26. The wireless device of claim 25, wherein the processor is configured with processor-executable instructions to perform operations further comprising:
   transmitting a request for a total amount due to the point-of-sale terminal;
   receiving a total amount due from the point-of-sale terminal;
   determining whether the total amount due satisfies a total amount due warning condition; and
   outputting a fifth signal in response to determining that the total amount due satisfies the total amount due warning condition.

27. The wireless device of claim 26, wherein the processor is configured with processor-executable instructions to perform operations further comprising:
   receiving a payment selection to complete a transaction for the total amount due;
   determining whether the payment selection includes a signal associated therewith; and
   outputting a sixth signal in response to determining that the payment selection includes a signal associated therewith.

28. The wireless device of claim 27, wherein the processor is configured with processor-executable instructions to perform operations further comprising determining whether the payment selection is a debit account or a credit account.

29. The wireless device of claim 28, wherein the processor is configured with processor-executable instructions to perform operations further comprising:
   determining whether a debit account includes sufficient funds to pay for the transaction in response to determining that the payment selection is a debit account; and
   outputting a seventh signal in response to determining that the debit account does not have sufficient funds to pay for the transaction.

30. The wireless device of claim 28, wherein the processor is configured with processor-executable instructions to perform operations further comprising:
   determining whether a debit account balance satisfies a debit account warning condition in response to determining that the payment selection is a debit account; and
   outputting an eighth signal in response to determining that the debit account balance satisfies the debit account warning condition.

31. The wireless device of claim 28, wherein the processor is configured with processor-executable instructions to perform operations further comprising:
   determining whether a credit account includes sufficient credit to pay for the transaction in response to determining that the payment selection is a credit account; and
   outputting a ninth signal in response to determining that the credit account does not have sufficient credit to pay for the transaction.

32. The wireless device of claim 28, wherein the processor is configured with processor-executable instructions to perform operations further comprising:
   determining whether a credit account balance satisfies a credit account warning condition in response to determining that the payment selection is a credit account; and
   outputting a tenth signal in response to determining that the credit account balance satisfies the credit account warning condition.

33. The wireless device of claim 27, wherein the processor is configured with processor-executable instructions to perform operations further comprising:
   transmitting payment information to the point-of-sale terminal;
   receiving a payment acknowledgement from the point-of-sale terminal;
   determining whether payment is approved based on the payment acknowledgement from the point-of-sale terminal; and
   outputting an eleventh signal in response to determining that the payment is not approved.

34. The wireless device of claim 33, wherein the processor is configured with processor-executable instructions to perform operations further comprising:
   requesting a receipt from the point-of-sale terminal, if payment is approved;
   receiving the receipt from the point-of-sale terminal;
   determining whether a final total satisfies a final total warning condition; and
   outputting a twelfth signal in response to determining that the final total satisfies the final total warning condition.

35. The wireless device of claim 18, wherein the wireless network card is a near-field communication (NFC) protocol device.

36. A wireless device, comprising:
   means for receiving in a transaction at least one price from a point-of-sale terminal via a wireless link;
   means for determining whether the at least one received price satisfies a price warning condition;
   means for outputting a first signal in response to determining that the at least one received price satisfies the price warning condition;
   means for determining whether the transaction includes a plurality of items;
   means for identifying one of the plurality of items associated with the at least one received price in response to determining that the transaction includes a plurality of items;
   means for requesting user input to determine whether to remove the identified item from the transaction in response to determining that the at least one received price satisfies the price warning condition; and
   means for outputting a second signal in response to determining that the at least one received price does not satisfy the price warning condition.

37. The wireless device of claim 36, wherein:
   means for outputting the first signal comprises means for outputting a first audible signal; and
   means for outputting the second signal comprises means for outputting a second audible signal at a different pitch than the first audible signal.

38. The wireless device of claim 36, wherein:
   means for outputting the first signal comprises means for outputting the first signal immediately upon determining that the at least one received price satisfies the price warning condition.

39. The wireless device of claim 36, wherein:
   means for outputting the first signal comprises means for outputting the first signal at a time after determining that the at least one received price satisfies the price warning condition.

40. The wireless device of claim 36, further comprising:
   means for receiving at least one item description from the point-of-sale terminal;
   means for determining a location of the wireless device; and
   means for searching a database with the at least one received price, the at least one item description, the determined location, or a combination thereof to determine at least one comparative price,
wherein means for determining whether the at least one received price satisfies a price warning condition comprises means for comparing the at least one comparative price to the at least one received price to determine whether the at least one received price is greater than the at least one comparative price for the at least one item by the pre-defined threshold.

41. The wireless device of claim 36, further comprising means for receiving a selection of a coupon in response to determining that the at least one received price satisfies the price warning condition.

42. The wireless device of claim 41, further comprising:
means for determining whether the coupon is valid; and
means for outputting a third signal if the coupon is not valid.

43. The wireless device of claim 42, further comprising:
means for transmitting the coupon to the point-of-sale terminal if the coupon is valid;
means for receiving a coupon acknowledgement from the point-of-sale terminal;
means for determining whether the coupon is accepted based on the coupon acknowledgement from the point-of-sale terminal; and
means for outputting a fourth signal in response to determining that the coupon is not accepted by the point-of-sale terminal.

44. The wireless device of claim 43, further comprising:
means for transmitting a request for a total amount due to the point-of-sale terminal;
means for receiving a total amount due from the point-of-sale terminal;
means for determining whether the total amount due satisfies a total amount due warning condition; and
means for outputting a fifth signal in response to determining that the total amount due satisfies the total amount due warning condition.

45. The wireless device of claim 44, further comprising:
means for receiving a payment selection to complete a transaction for the total amount due;
means for determining whether the payment selection includes a signal associated therewith; and
means for outputting a sixth signal in response to determining that the payment selection includes a signal associated therewith.

46. The wireless device of claim 45, further comprising means for determining whether the payment selection is a debit account or a credit account.

47. The wireless device of claim 46, further comprising:
means for determining whether a debit account includes sufficient funds to pay for the transaction in response to determining that the payment selection is a debit account; and
means for outputting a seventh signal in response to determining that the debit account does not have sufficient funds to pay for the transaction.

48. The wireless device of claim 46, further comprising:
means for determining whether a debit account balance satisfies a debit account warning condition in response to determining that the payment selection is a debit account; and
means for outputting an eighth signal in response to determining that the debit account balance satisfies the debit account warning condition.

49. The wireless device of claim 46, further comprising:
means for determining whether a credit account includes sufficient credit to pay for the transaction in response to determining that the payment selection is a credit account; and
means for outputting a ninth signal in response to determining that the credit account does not have sufficient credit to pay for the transaction.

50. The wireless device of claim 46, further comprising:
means for determining whether a credit account balance satisfies a credit account warning condition in response to determining that the payment selection is a credit account; and
means for outputting a tenth signal in response to determining that the credit account balance satisfies the credit account warning condition.

51. The wireless device of claim 45, further comprising:
means for transmitting payment information to the point-of-sale terminal;
means for receiving a payment acknowledgement from the point-of-sale terminal;
means for determining whether payment is approved based on the payment acknowledgement from the point-of-sale terminal; and
means for outputting a eleventh signal in response to determining that the payment is not approved.

52. The wireless device of claim 51, further comprising:
means for requesting a receipt from the point-of-sale terminal, if payment is approved;
means for receiving the receipt from the point-of-sale terminal;
means for determining whether a final total satisfies a final total warning condition; and
means for outputting an twelfth signal in response to determining that the final total satisfies the final total warning condition.

53. A non-transitory computer-readable storage medium having stored thereon processor-executable instructions configured to cause a processor of a wireless device to perform operations in a transaction comprising:
receiving at least one price from a point-of-sale terminal via a wireless link;
determining whether the at least one received price satisfies a price warning condition;
outputting a first signal at the wireless device in response to determining that the at least one received price satisfies the price warning condition;
determining whether the transaction includes a plurality of items;
in response to determining that the transaction includes a plurality of items:
identifying one of the plurality of items associated with the at least one received price; and
requesting user input to determine whether to remove the identified item from the transaction in response to determining that the at least one received price satisfies the price warning condition; and
outputting a second signal at the wireless device in response to determining that the at least one received price does not satisfy the price warning condition.

54. The non-transitory computer-readable storage medium of claim 53, wherein the stored processor-executable instructions are configured to cause a processor of a wireless device to perform operations such that the first and second signals are audible signals, and the first signal has a pitch that is different than a pitch of the second signal.

55. The non-transitory computer-readable storage medium of claim 53, wherein the stored processor-executable instructions are configured to cause a processor of a wireless device to perform operations such that outputting the first signal at the wireless device comprises outputting the first signal immediately upon determining that the at least one received price satisfies the price warning condition.

56. The non-transitory computer-readable storage medium of claim 53, wherein the stored processor-executable instructions are configured to cause a processor of a wireless device to perform operations such that outputting the first signal at the wireless device comprises outputting the first signal at a time after determining that the at least one received price satisfies the price warning condition.

57. The non-transitory computer-readable storage medium of claim 53, wherein the stored processor-executable instructions are configured to cause a processor of a wireless device to perform operations further comprising:
receiving at least one item description from the point-of-sale terminal;
determining a location of the wireless device; and
searching a database with the at least one received price, the at least one item description, the determined location, or a combination thereof to determine at least one comparative price,
wherein means for determining whether the at least one received price satisfies a price warning condition comprises means for comparing the at least one comparative price to the at least one received price sale to determine whether the at least one received price is greater than the at least one comparative price for the at least one item by a pre-defined threshold.

58. The non-transitory computer-readable storage medium of claim 53, wherein the stored processor-executable instructions are configured to cause a processor of a wireless device to perform operations further comprising:
receiving a selection of a coupon in response to determining that the at least one received price satisfies the price warning condition.

59. The non-transitory computer-readable storage medium of claim 58, wherein the stored processor-executable instructions are configured to cause a processor of a wireless device to perform operations further comprising:
determining whether the coupon is valid; and
outputting a third signal at the wireless device if the coupon is not valid.

60. The non-transitory computer-readable storage medium of claim 59, wherein the stored processor-executable instructions are configured to cause a processor of a wireless device to perform operations further comprising:
transmitting the coupon to the point-of-sale terminal if the coupon is valid;
receiving a coupon acknowledgement from the point-of-sale terminal;
determining whether the coupon is accepted based on the coupon acknowledgement from the point-of-sale terminal; and
outputting a fourth signal at the wireless device in response to determining that the coupon is not accepted by the point-of-sale terminal.

61. The non-transitory computer-readable storage medium of claim 60, wherein the stored processor-executable instructions are configured to cause a processor of a wireless device to perform operations further comprising:
transmitting a request for a total amount due to the point-of-sale terminal;
receiving a total amount due from the point-of-sale terminal;
determining whether the total amount due satisfies a total amount due warning condition; and
outputting a fifth signal at the wireless device in response to determining that the total amount due satisfies the total amount due warning condition.

62. The non-transitory computer-readable storage medium of claim 61, wherein the stored processor-executable instructions are configured to cause a processor of a wireless device to perform operations further comprising:
receiving a payment selection to complete a transaction for the total amount due;
determining whether the payment selection includes a signal associated therewith; and
outputting a sixth signal at the wireless device in response to determining that the payment selection includes a signal associated therewith.

63. The non-transitory computer-readable storage medium of claim 62, wherein the stored processor-executable instructions are configured to cause a processor of a wireless device to perform operations further comprising determining whether the payment selection is a debit account or a credit account.

64. The non-transitory computer-readable storage medium of claim 63, wherein the stored processor-executable instructions are configured to cause a processor of a wireless device to perform operations further comprising:
determining whether a debit account includes sufficient funds to pay for the transaction in response to determining that the payment selection is a debit account; and
outputting a seventh signal at the wireless device in response to determining that the debit account does not have sufficient funds to pay for the transaction.

65. The non-transitory computer-readable storage medium of claim 63, wherein the stored processor-executable instructions are configured to cause a processor of a wireless device to perform operations further comprising:
determining whether a debit account balance satisfies a debit account warning condition in response to determining that the payment selection is a debit account; and
outputting an eighth signal at the wireless device in response to determining that the debit account balance satisfies the debit account warning condition.

66. The non-transitory computer-readable storage medium of claim 63, wherein the stored processor-executable instructions are configured to cause a processor of a wireless device to perform operations further comprising:
determining whether a credit account includes sufficient credit to pay for the transaction in response to determining that the payment selection is a credit account; and
outputting a ninth signal at the wireless device in response to determining that the credit account does not have sufficient credit to pay for the transaction.

67. The non-transitory computer-readable storage medium of claim 63, wherein the stored processor-executable instructions are configured to cause a processor of a wireless device to perform operations further comprising:
determining whether a credit account balance satisfies a credit account warning condition in response to determining that the payment selection is a credit account; and
outputting a tenth signal at the wireless device in response to determining that the credit account balance satisfies the credit account warning condition.

68. The non-transitory computer-readable storage medium of claim 62, wherein the stored processor-executable instructions are configured to cause a processor of a wireless device to perform operations further comprising:

transmitting payment information to the point-of-sale terminal;

receiving a payment acknowledgement from the point-of-sale terminal;

determining whether payment is approved based on the payment acknowledgement from the point-of-sale terminal; and outputting an eleventh signal at the wireless device in response to determining that the payment is not approved.

69. The non-transitory computer-readable storage medium of claim 68, wherein the stored processor-executable instructions are configured to cause a processor of a wireless device to perform operations further comprising:

requesting a receipt from the point-of-sale terminal, if payment is approved;

receiving the receipt from the point-of-sale terminal;

determining whether a final total satisfies a final total warning condition; and outputting a twelfth signal at the wireless device in response to determining that the final total satisfies the final total warning condition.

* * * * *